(12) United States Patent
Kurronen (10) Patent No.: US 8,598,760 B2
(45) Date of Patent: Dec. 3, 2013

(54) PERMANENT MAGNET MODULE FOR AN ELECTRICAL MACHINE

(75) Inventor: Panu Kurronen, Lappeenranta (FI)

(73) Assignee: The Switch Drive Systems Oy, Lappeenranta (FI)

( * ) Notice: Subject to any disclaimer, the term of this patent is extended or adjusted under 35 U.S.C. 154(b) by 301 days.

(21) Appl. No.: 13/133,552

(22) PCT Filed: Dec. 8, 2009

(86) PCT No.: PCT/FI2009/050987
§ 371 (c)(1),
(2), (4) Date: Aug. 5, 2011

(87) PCT Pub. No.: WO2010/070196
PCT Pub. Date: Jun. 24, 2010

(65) Prior Publication Data
US 2011/0285216 A1    Nov. 24, 2011

(30) Foreign Application Priority Data
Dec. 17, 2008    (FI) ..................................... 20086202

(51) Int. Cl.
*H02K 1/27*    (2006.01)
*H02K 15/03*   (2006.01)
*H02K 1/28*    (2006.01)
*H02K 21/12*   (2006.01)

(52) U.S. Cl.
USPC ............ 310/156.08; 310/156.52; 310/156.23; 310/156.48; 29/598

(58) Field of Classification Search
USPC ............. 310/156.08, 45, 59, 156.53, 156.12, 310/156.23, 156.48, 156.49, 156.51, 310/156.52, 156.59, 156.63, 156.33, 310/216.057, 216.058, 216.064, 310/216.079–216.088; 29/598
IPC ................. H02K 1/27,15/02, 1/28, 1/24, 21/16, H02K 1/32, 21/12, 21/14, 15/03
See application file for complete search history.

(56) References Cited

U.S. PATENT DOCUMENTS

| | | | | |
|---|---|---|---|---|
| 7,573,168 B2 * | 8/2009 | Carl et al. | ................ | 310/156.08 |
| 7,781,932 B2 * | 8/2010 | Jansen | ...................... | 310/156.08 |
| 7,936,102 B2 * | 5/2011 | Pabst et al. | ............... | 310/156.08 |
| 8,084,910 B2 * | 12/2011 | Silander | ................... | 310/156.23 |
| 2004/0169575 A1 | 9/2004 | Knauff et al. | | |
| 2007/0090711 A1 | 4/2007 | Carl, Jr. et al. | | |

FOREIGN PATENT DOCUMENTS

EP    2 071 704 B1    8/2010

\* cited by examiner

*Primary Examiner* — Burton Mullins
*Assistant Examiner* — Michael Andrews
(74) *Attorney, Agent, or Firm* — Birch, Stewart, Kolasch & Birch, LLP (57) ABSTRACT

A permanent magnet module for a rotor of a permanent magnet electrical machine is presented. The permanent magnet module comprises: a stack of ferromagnetic steel sheets (104) having a groove in the direction perpendicular to the ferromagnetic steel sheets, and a permanent magnet (105) located in the groove and arranged to produce magnetic flux that penetrates a surface (106) of the stack of ferromagnetic steel sheets. The surface has a shape suitable for forming a desired magnetic flux density distribution into an air-gap of the permanent magnet electrical machine. The permanent magnet module further comprises a base-plate (102) made of solid ferromagnetic steel. The base plate is located at an opening (116) of the groove and constitutes together with the groove an aperture in which the permanent magnet is located.

15 Claims, 7 Drawing Sheets

PERMANENT MAGNET MODULE FOR AN ELECTRICAL MACHINE

CROSS-REFERENCED TO RELATED APPLICATION

This application is a National Stage entry of International Application No. PCT/FI2009/050987, filed Dec. 8, 2009, which claims priority to Finland Patent Application No. 20086202, filed Dec. 17, 2008, the duty of disclosure of the prior application in its entirety by reference.

FIELD OF THE INVENTION

The invention relates to a permanent magnet module for a rotor of a permanent magnet electrical machine. Furthermore, the invention relates to a rotor of a permanent magnet electrical machine. Furthermore, the invention relates to a permanent magnet electrical machine. Furthermore, the invention relates to a method for assembling a rotor of a permanent magnet electrical machine. Furthermore, the invention relates to a method for assembling a permanent magnet electrical machine.

BACKGROUND

One of the challenges in designing permanent magnet electrical machines, i.e. permanent magnet motors or generators, is related to fixing of permanent magnets to a rotor of a permanent magnet electrical machine. Usually the construction of the rotor is a compromise with respect to several factors such as, for example: cooling of the permanent magnets, mechanical strength especially against centrifugal forces, hermetic protection against moisture and other environmental factors, utilization of the material of the permanent magnets without e.g. excessive leakage magnetic fluxes via e.g. supporting structures, simplicity/complexity of the shape of the permanent magnets, fluctuations of produced torque, and factors related to installation and manufacture.

Publication EP1860755A2 discloses a permanent magnet rotor arrangement that includes a rotor having an outer rim. A circumferential array of magnet carriers is affixed to a surface of the outer rim. Each magnet carrier has a surface facing towards the radial direction. An inverted U-shaped retainer made of nonmagnetic material such as stainless steel or glass-reinforced epoxy resin is affixed to each magnet carrier and is arranged to form together with the magnet carrier an axially extending channel. At least one piece of permanent magnet material is located in the axially extending channel. The magnet carrier, the inverted U-shaped retainer, and the at least one piece of permanent magnet material constitute a permanent magnet module that extends over 360/N degrees in the tangential direction of the rotor, where N is the number of permanent magnet modules that are located successively in the tangential direction. Permanent magnet modules of the kind described above can be produced separately and used as building blocks of a permanent magnet rotor. Spatial distribution of magnetic flux density in an air-gap of a permanent magnet electrical machine has to be sufficiently close to a desired form in order to keep fluctuations of torque produced by the permanent magnet electrical machine at a sufficiently low level. In conjunction with permanent magnet modules of the kind described above, achieving a desired spatial distribution of the magnetic flux density requires shaping of the permanent magnets. For example, rectangular prism shaped permanent magnets do not necessarily provide a sufficiently good quality of operation. Therefore, there is a trade-off between the complexity of the shape of the permanent magnets and the quality of operation. The need for shaping the permanent magnets makes the permanent magnets more expensive and more difficult to manufacture.

SUMMARY

In accordance with a first aspect of the invention, there is provided a new permanent magnet module for a rotor of a permanent magnet electrical machine. The permanent magnet module extends over at most 180 degrees in the tangential direction of the rotor and comprises:
  a stack of ferromagnetic steel sheets comprising at least one groove in a direction perpendicular to the ferromagnetic steel sheets,
  at least one permanent magnet located in the at least one groove and arranged to produce magnetic flux that penetrates a surface of the stack of ferromagnetic steel sheets, the surface of the stack of ferromagnetic steel sheets having a shape suitable for forming a pre-determined magnetic flux density distribution into an air-gap of the permanent magnet electrical machine,
  a supporting structure arranged to mechanically support the stack of ferromagnetic steel sheets, and
  at least one base-plate made of solid ferromagnetic steel, each base-plate being located at an opening of one of the at least one groove and constituting together with the at least one groove an aperture in which the at least one permanent magnet is located.

The shape of the aperture formed by the groove and the base-plate is preferably a rectangular prism so as to allow also the shape of a permanent magnet to be a simple rectangular prism. On the other hand, the shape of the above-mentioned surface of the stack of ferromagnetic steel sheets can be designed freely by using steel sheets that have a suitable form. Hence, a desired spatial distribution of magnetic flux density in an air-gap of a permanent magnet electrical machine can be achieved without a need for complicated shapes of permanent magnets.

In accordance with a second aspect of the invention, there is provided a new rotor of a permanent magnet electrical machine. The rotor comprises a central part having a shaft, and at least two permanent magnet modules according to the invention on the surface of the central part and located successively in the tangential direction of the rotor.

In accordance with a third aspect of the invention, there is provided a new permanent magnet electrical machine. The permanent magnet electrical machine has a rotor that comprises a central part having a shaft. The rotor comprises at least two permanent magnet modules according to the invention on the surface of the central part and located successively in the tangential direction of the rotor.

In accordance with a fourth aspect of the invention, there is provided a new method for assembling a rotor of a permanent magnet electrical machine. The method comprises installing a permanent magnet module according to the invention onto a surface of a central part of the rotor.

In accordance with a fourth aspect of the invention, there is provided a new method for assembling a permanent magnet electrical machine. The method comprises installing a rotor into a stator bore of the permanent magnet electrical machine, wherein the rotor comprises at least two permanent magnet modules according to the invention on a surface of a central part of the rotor and located successively in the tangential direction of the rotor.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that does not exclude the existence of also unrecited features. The features recited in depending claims are mutually freely combinable unless otherwise explicitly stated.

BRIEF DESCRIPTION OF THE FIGURES

The exemplifying embodiments of the invention and their advantages are explained in greater detail below in the sense of examples and with reference to the accompanying drawings, in which.

DESCRIPTION OF THE EMBODIMENTS

Figure 1A:
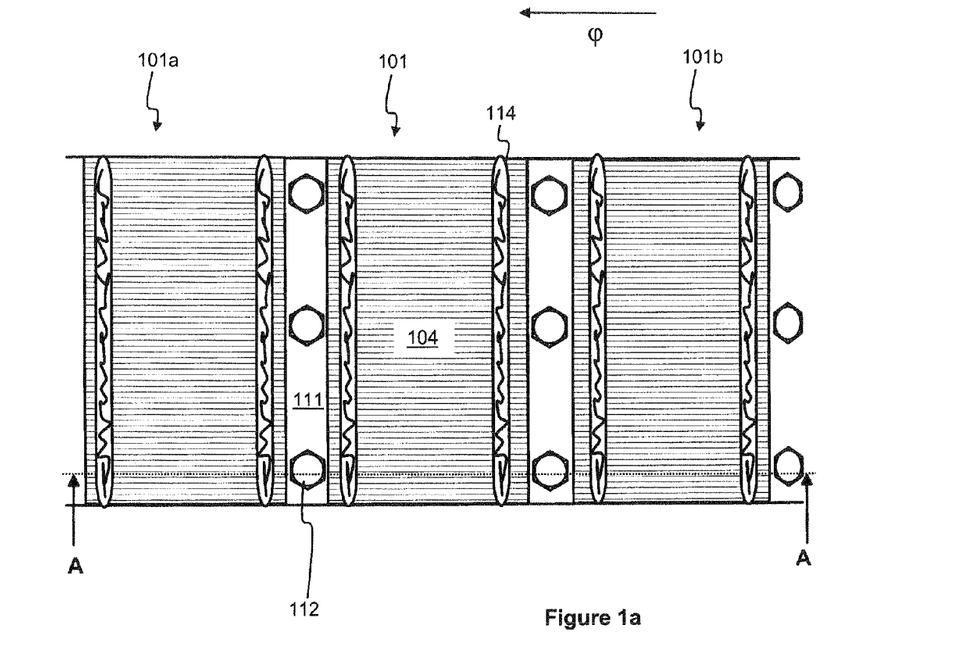
FIG. 1a shows a permanent magnet module according to an embodiment of the invention and FIG. 1b shows a section view of the permanent magnet module.
Figure 1B:
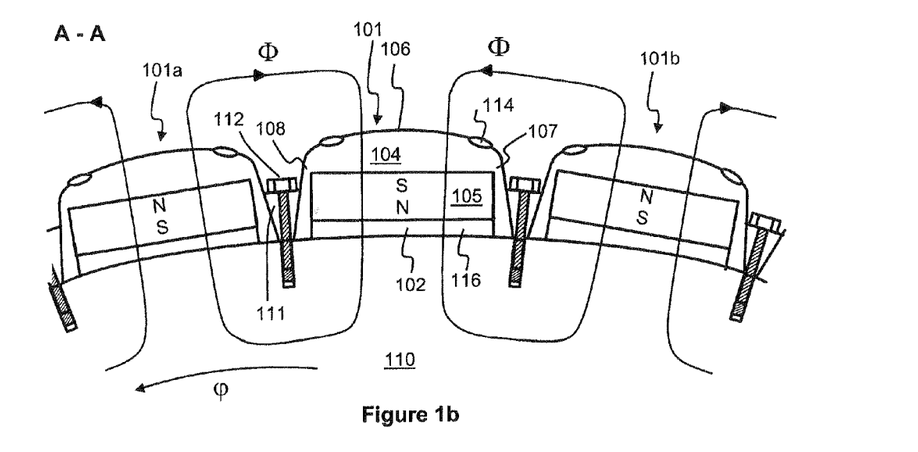

FIG. 1a shows permanent magnet modules 101, 101a, and 101b according to an embodiment of the invention for a rotor of a permanent magnet electrical machine. FIG. 1b shows the section view A-A of the permanent magnet modules. Each permanent magnet module extends over 360/N degrees in the tangential direction φ of the rotor, where N is the number of permanent magnet modules that are located successively in the tangential direction. As there are at least two permanent magnet modules (N>1), one permanent magnet module extends over at most 180 degrees in the tangential direction. FIGS. 1a and 1b show, however, a partial view of a case in which the number of permanent magnet modules is significantly higher than two. In the case shown in FIGS. 1a and 1b, the permanent magnet modules 101, 101a, and 101b are fastened to a central part 110 of the rotor with fastening wedges (e.g. 111) and bolts (e.g. 112). Without limiting generality, the following text can be focused to the permanent magnet module 101. The permanent magnet module 101 comprises a stack of ferromagnetic steel sheets 104 having a groove in the direction perpendicular to the ferromagnetic steel sheets, i.e. in the axial direction of the rotor. The permanent magnet module 101 comprises a permanent magnet 105 located in the groove of the stack of ferromagnetic steel sheets. The permanent magnet is arranged to produce magnetic flux Φ that penetrates a surface 106 of the stack of ferromagnetic steel sheets, the said surface being intended to face towards an air-gap of the permanent magnet electrical machine. The surface 106 has a shape suitable for forming a pre-determined magnetic flux density distribution into the air-gap of the permanent magnet electrical machine. The permanent magnet module 101 comprises a base-plate 102 made of solid ferromagnetic steel. The base-plate is located at an opening of the groove and constitutes together with the groove an aperture in which the permanent magnet 105 is located.

As can be seen from FIGS. 1a and 1b, the magnetic flux Φ flows in parallel with the ferromagnetic steel sheets and there is a portion of the stack of ferromagnetic steel sheets between the permanent magnet 105 and the surface 106 intended to face towards the air-gap. Hence, eddy current losses induced by air-gap spatial harmonics of the magnetic flux density distribution can be kept at a sufficiently low level both in the stack of ferromagnetic steel sheets and in the permanent magnet. As can be seen from FIG. 1b, the surface 106 can be shaped without causing requirements related to the shape of the permanent magnet 105, i.e. the shape of the permanent magnet can be a simple rectangular prism and, regardless of the shape of the permanent magnet, the surface 106 can have a desired curvature.

Neck areas 108 and 107 of the stack of ferromagnetic steel sheets are preferably so thin that leakage magnetic fluxes via those neck areas are sufficiently small due to the magnetic saturation on the said neck areas. The permanent magnet 105 can be composed of one of more pieces of permanent magnet material. The permanent magnet material can be, for example, AlNiCo-steel (Aluminium-NickelCobalt) or a rare earth-metal permanent magnet material such as e.g. SamariumCobalt permanent magnet material or NbFeB-permanent magnet material (Neodymium-Iron-Boron). The permanent magnet module 101 comprises a supporting structure arranged to mechanically support the stack of ferromagnetic steel sheets 104. In the exemplifying case shown in FIGS. 1a and 1b, the supporting structure comprises welds (e.g. 114) extending from one end of the stack of ferromagnetic steel sheets 104 to another end of the stack of ferromagnetic steel sheets. The permanent magnet 105 and the base-plate 102 can be fastened to the groove of the stack of ferromagnetic steel sheets for example by casting resin or other suitable material into the groove after the permanent magnet and the base-plate have been placed in their final positions. It is also possible to use end-plates or other mechanical arrangements that are adapted to prevent the permanent magnet 105 and the base-plate from moving in the direction perpendicular to the ferromagnetic steel sheets.

A permanent magnet module according to an embodiment of the invention is provided with a hermetic coating. The hermetic coating protects the permanent magnet module against moisture and other harmful environmental factors. The hermetic coating can be made of for example plastic or resin (e.g. epoxy resin).

Figure 2A:
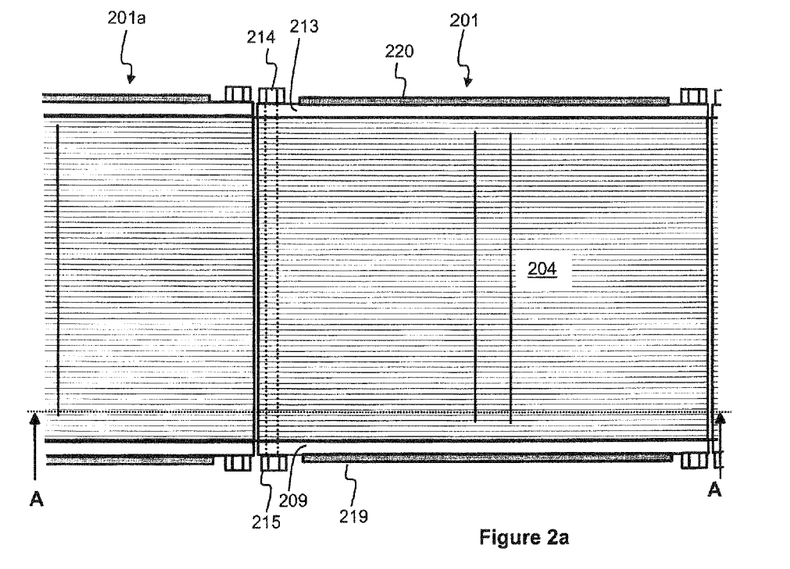
FIG. 2a shows a permanent magnet module according to an embodiment of the invention and FIG. 2b shows a section view of the permanent magnet module.
Figure 2B:
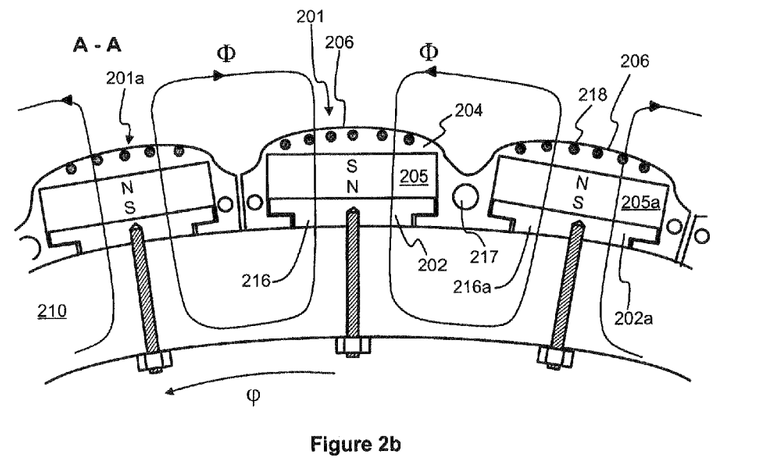

FIG. 2a shows permanent magnet modules 201, 201a according to an embodiment of the invention for a rotor of a permanent magnet electrical machine. FIG. 2b shows the section view A-A of the permanent magnet modules. Without limiting generality, the following text can be focused to the permanent magnet module 201. The permanent magnet module 201 comprises a stack of ferromagnetic steel sheets 204 having two grooves in the direction perpendicular to the ferromagnetic steel sheets, i.e. in the axial direction of the rotor. The permanent magnet module 201 comprises base-plates 202 and 202a made of solid ferromagnetic steel. Each base-plate is located at an opening of one of the grooves and constitutes together with the respective groove an aperture for a permanent magnet. The permanent magnet module 201 comprises end-plates 209 and 213 at both ends of the stack of ferromagnetic steel sheets. The end-plates, the base-plates, and the grooves form two rectangular cavities. The permanent magnet module 201 comprises a permanent magnet 205 located in one of the said two cavities and a permanent magnet 205a located in another of the said two cavities. The permanent magnets 205 and 205a are arranged to produce magnetic flux $\Phi$ that penetrates a surface 206 of the stack of ferromagnetic steel sheets, the said surface being intended to face towards an air-gap of a permanent magnet electrical machine. The surface 206 has a shape suitable for forming a predetermined magnetic flux density distribution into the air-gap of the permanent magnet electrical machine. The permanent magnet module 201 comprises a supporting structure arranged to mechanically support the stack of ferromagnetic steel sheets 204 and the end-plates 209 and 213. In the exemplifying case shown in FIGS. 2a and 2b, the supporting structure comprises bolts (or threaded rods) extending through the stack of ferromagnetic steel sheets 204 from one of the end-plates to another of the end-plates and corresponding nuts. In FIG. 2a, reference numbers 214 and 215 are related to the supporting structure.

The end-plates 209 and 213 are preferably made of non-magnetic material such as e.g. stainless steel. It is also possible that the end-plates are made of ferromagnetic material in such a manner that the end-plates have portions the thickness of which is adapted to limit, with the aid of magnetic saturation, leakage magnetic fluxes via the end-plates to a sufficiently low level, or the end-plates have apertures that limit the leakage magnetic fluxes but do not allow the permanent magnets to move in the direction perpendicular to the ferromagnetic steel sheets.

A permanent magnet module according to an embodiment of the invention comprises at least one aperture 217 that is/are arranged to allow flow of cooling fluid through the stack of ferromagnetic steel sheets and the end-plates.

In a permanent magnet module according to an embodiment of the invention, the openings 216 and 216a of the grooves are arranged to constitute T-shaped grooves and the base-plates 202 and 202a are arranged to constitute T-shaped wedges for fastening the permanent magnet module to a central part 210 of the rotor.

A permanent magnet module according to an embodiment of the invention comprises a damper winding. The damper winding can be, for example, composed of electrically conductive bars (e.g. 218) and of electrically conductive short-circuit elements 219 and 220. The electrically conductive bars are arranged to extend through the stack of ferromagnetic steel sheets and the electrically conductive short-circuit elements 219 and 220 are arranged to form galvanic connection between respective ends of the electrically conductive bars.

The permanent magnet module 101 shown in FIGS. 1a and 1b constitutes one magnetic pole on the surface of the rotor, and the permanent magnet module 201 shown in FIGS. 2a and 2b constitutes two magnetic poles, i.e. one pole pair, on the surface of the rotor. It should be, however, noted that the number of magnetic poles constituted by a permanent magnet module according to an embodiment of the invention can be also greater than two.

Figure 3A:
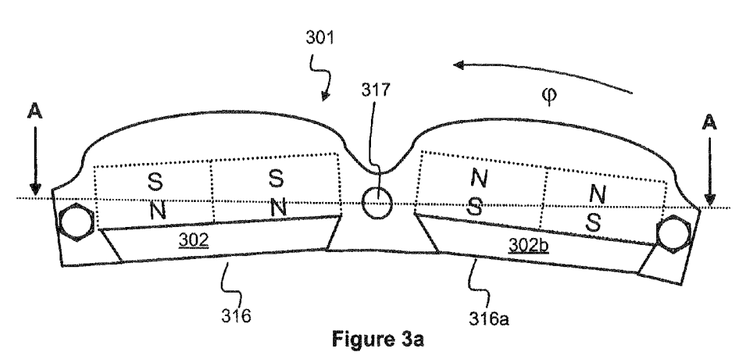
FIG. 3a shows a permanent magnet module according to an embodiment of the invention and FIG. 3b shows a section view of the permanent magnet module.
Figure 3B:
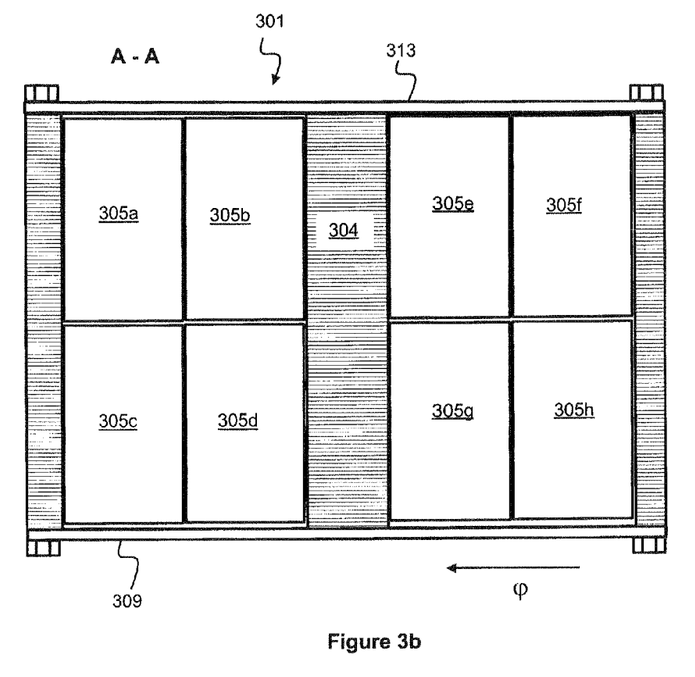

FIG. 3a shows a butt-end view of a permanent magnet module 301 according to an embodiment of the invention for a rotor of a permanent magnet electrical machine. FIG. 3b shows the section view A-A of the permanent magnet module. The permanent magnet module comprises a stack of ferromagnetic steel sheets 304 having two grooves in the direction perpendicular to the ferromagnetic steel sheets, i.e. in the axial direction of the rotor. The permanent magnet module comprises base-plates 302 and 302a made of solid ferromagnetic steel. Each base-plate is located at an opening of one of the grooves and constitutes together with the respective groove an aperture for a permanent magnet. The permanent magnet module comprises end-plates 309 and 313 at both ends of the stack of ferromagnetic steel sheets. The end-plates, the base-plates, and the grooves form two cavities. The permanent magnet module comprises a first permanent magnet located in one of the said two cavities and a second permanent magnet located in another of the said two cavities. Openings 316 and 316a of the grooves are arranged to constitute dovetail-shaped grooves and the base-plates 302 and 302a are arranged to constitute dovetail-shaped wedges for fastening the permanent magnet module to a central part of the rotor.

The permanent magnet module 301 comprises an aperture 317 that is arranged to allow flow of cooling fluid through the stack of ferromagnetic steel sheets 304 and the end-plates 309 and 313.

The first permanent magnet consists of pieces 305a-305d of permanent magnet material and the second permanent magnet consists of pieces 305e-305h of permanent magnet material. As evident on the basis of FIG. 3b, it is in a general case possible to have two or more successive pieces of permanent magnet material in the direction perpendicular to the steel sheets, i.e. in the axial direction of the rotor, as well as to have two or more successive pieces of permanent magnet material in the tangential direction $\phi$ of the rotor. Hence, maximum dimensions of the pieces of permanent magnet material do not set limitations to the dimensions of the permanent magnet module. The maximum dimensions of the pieces of permanent magnet material can depend, for example, on issues related to manufacturing techniques of permanent magnets.

In a permanent magnet module according to an embodiment of the invention, the permanent magnet located in the cavity comprises a plurality of pieces of permanent magnet material which are located successively in the tangential direction of the rotor.

In a permanent magnet module according to an embodiment of the invention, the permanent magnet located in the cavity comprises a plurality of pieces of permanent magnet material which are located successively in the direction perpendicular to the ferromagnetic steel sheets.

Figure 4:
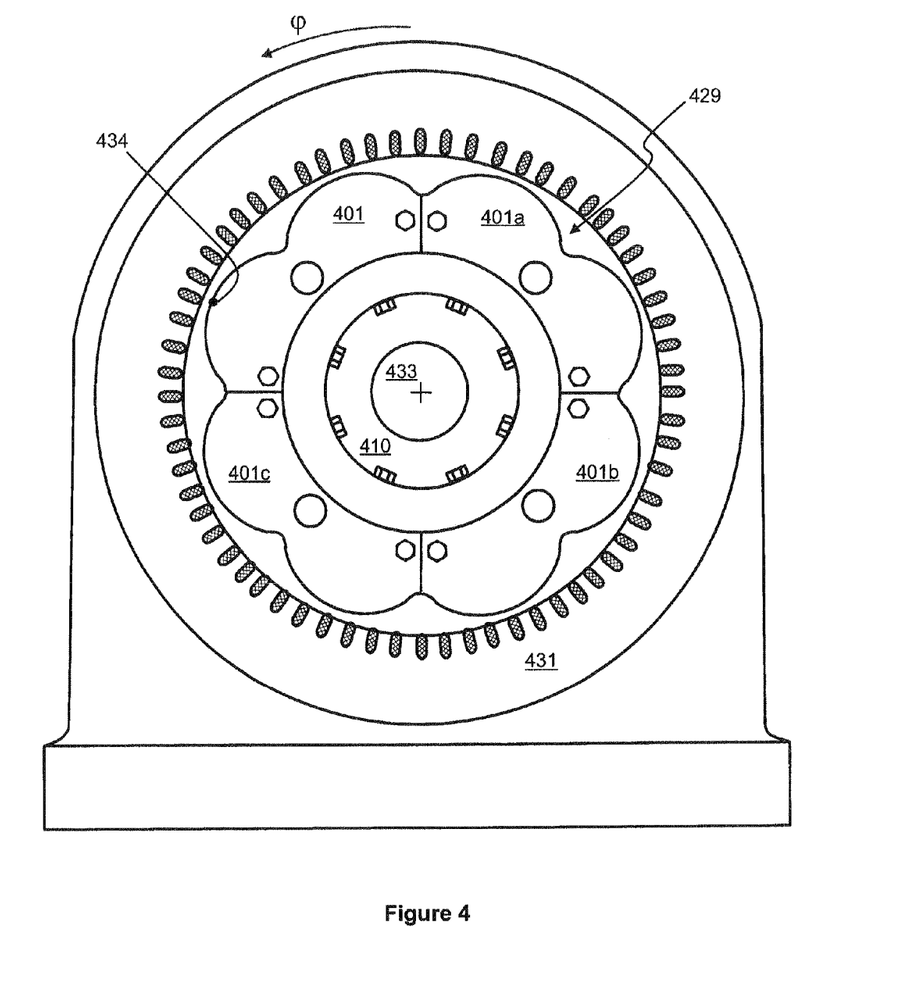
FIG. 4 shows a permanent magnet electrical machine according to an embodiment of the invention.

FIG. 4 shows a permanent magnet electrical machine according to an embodiment of the invention. The permanent magnet machine comprises a stator 431 and a rotor 429 according to an embodiment of the invention. The rotor comprises a central part 410 having a shaft 433. The rotor further comprises permanent magnet modules 401, 401a, 401b and 401c on the surface of the central part and located successively in the tangential direction of the rotor. The permanent magnet modules can be, for example, according to what is described above and with the aid of FIGS. 2a and 2b or with the aid of FIGS. 3a and 3b.

Figure 7:
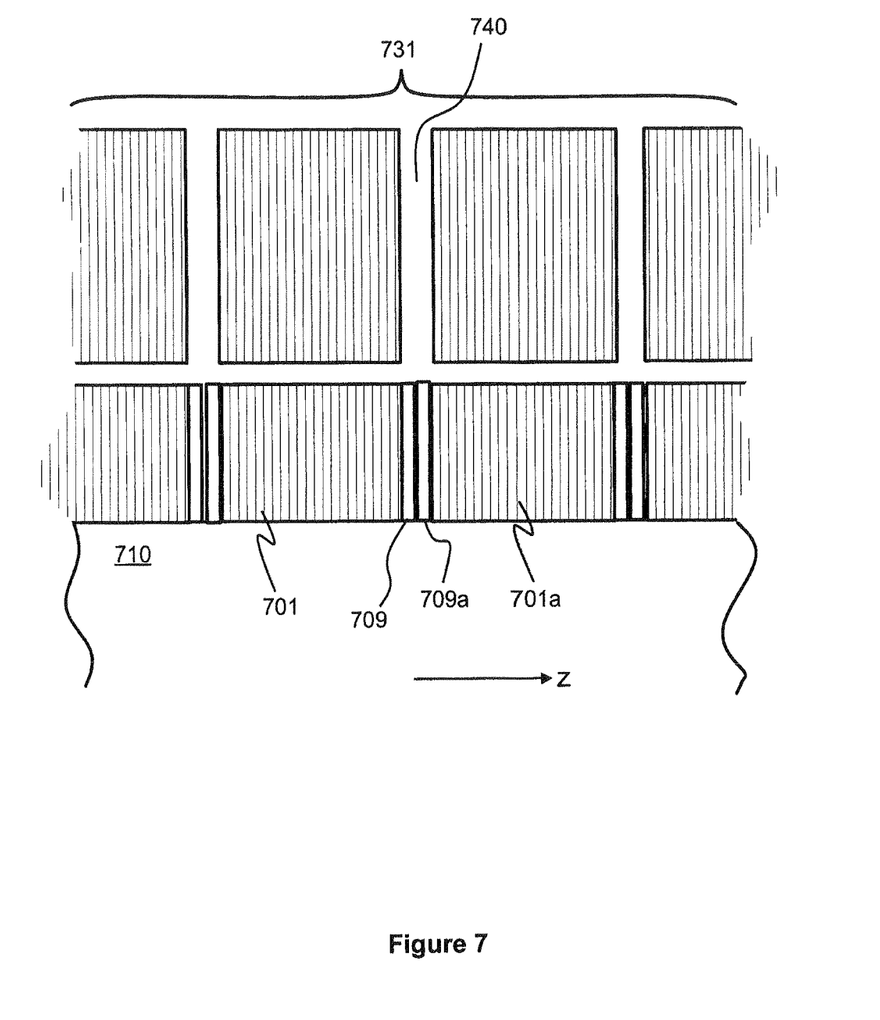
FIG. 7 shows a partial section view of a permanent magnet electrical machine according to an embodiment of the invention.

A rotor according to an embodiment of the invention comprises permanent magnet modules according to an embodiment of the invention located successively in the axial direction of the rotor. The axially successive permanent magnet modules can be situated, for example, in such a manner that adjacent ends of adjacent permanent magnet modules are, in the axial direction, in line with radial cooling ducts of the stator. FIG. 7 shows a partial section view of a permanent magnet electrical machine according to an embodiment of the invention. The permanent magnet electrical machine comprises a stator 731 that is provided with radial cooling ducts 740. On the surface of a central part 710 of a rotor there are permanent magnet modules 701, 701a located successively in the axial direction of the rotor, i.e. the z-direction. End-plates 709 and 709a of the axially adjacent permanent magnet modules 701 and 701a are, in the z-direction, in line with the radial cooling duct 740 of the stator.

A rotor according to an embodiment of the invention comprises permanent magnet modules according to an embodiment of the invention located successively in the axial direction of the rotor and there is a tangential shift between axially successive permanent magnet modules, i.e. the axially successive permanent magnet modules are not aligned in the tangential direction but they are located stepwise in the tangential direction. The stepwise installation of the permanent magnet modules can be used for reducing or eliminating fluctuations of torque produced by the permanent magnet electrical machine.

In a rotor according to an embodiment of the invention, the permanent magnet modules are located askew or are skewed with respect to the axial direction of the rotor, i.e. there is a non-zero angle between the axial direction of the rotor and a line along those points of the stack of ferromagnetic steel sheets that are closest to the stator. The skewness can be used for reducing or eliminating fluctuations of torque produced by the permanent magnet electrical machine. Point 434 in FIG. 4 can be seen to represent a "cross section" of the above-mentioned line.

In a rotor according to an embodiment of the invention, the permanent magnet modules have a curvilinear (i.e. not straight) path along those points of the stack of ferromagnetic steel sheets that are closest to the stator. Point 434 in FIG. 4 can be seen to represent a "cross section" of the above-mentioned curvilinear path. The above-described property can be used for reducing or eliminating fluctuations of torque produced by the permanent magnet electrical machine. The curvilinear path can be e.g. meandering as a sine curve.

The above-mentioned skewed or curvilinear solutions can be realised, for example, by assembling the stack of ferromagnetic steels sheets of a permanent magnet module using steel sheets that are not mutually similar. By using mutually different steel sheets it is possible to have a rectangular groove (grooves) for a permanent magnet (magnets) in spite of the skewness or curvilinearity.

Figure 5:
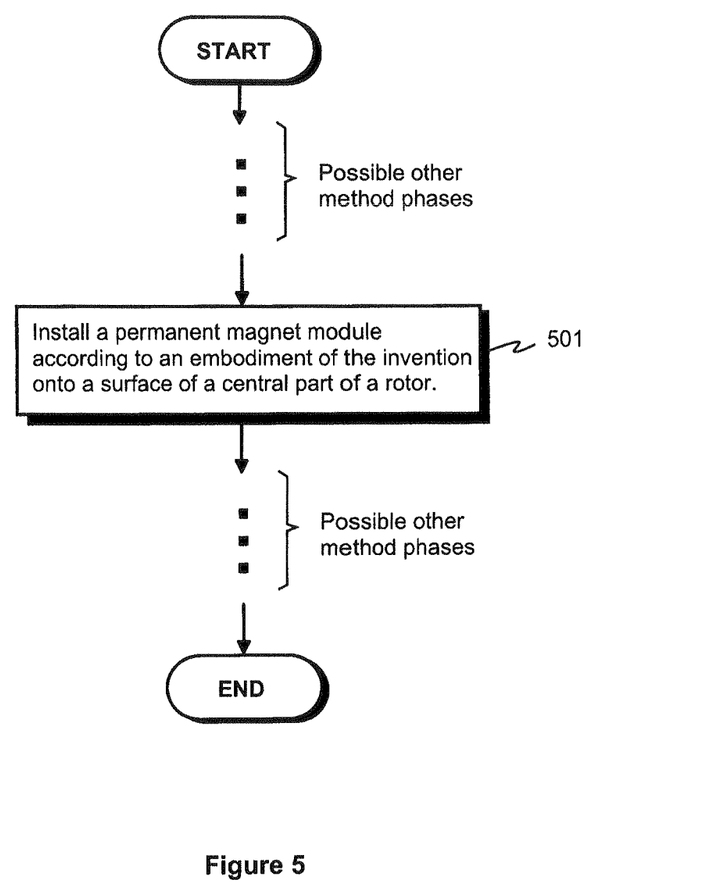
FIG. 5 is a flow chart of a method according to an embodiment of the invention for assembling a rotor of a permanent magnet electrical machine.

FIG. 5 is a flow chart of a method according to an embodiment of the invention for assembling a rotor of a permanent magnet electrical machine. The method comprises installing (phase 501) a permanent magnet module according to an embodiment of the invention onto a surface of a central part of the rotor. The permanent magnet module can be, for example, according to what is described earlier in this document and with the aid of FIGS. 1a and 1b, or FIGS. 2a and 2b, or FIGS. 3a and 3b.

Figure 6:
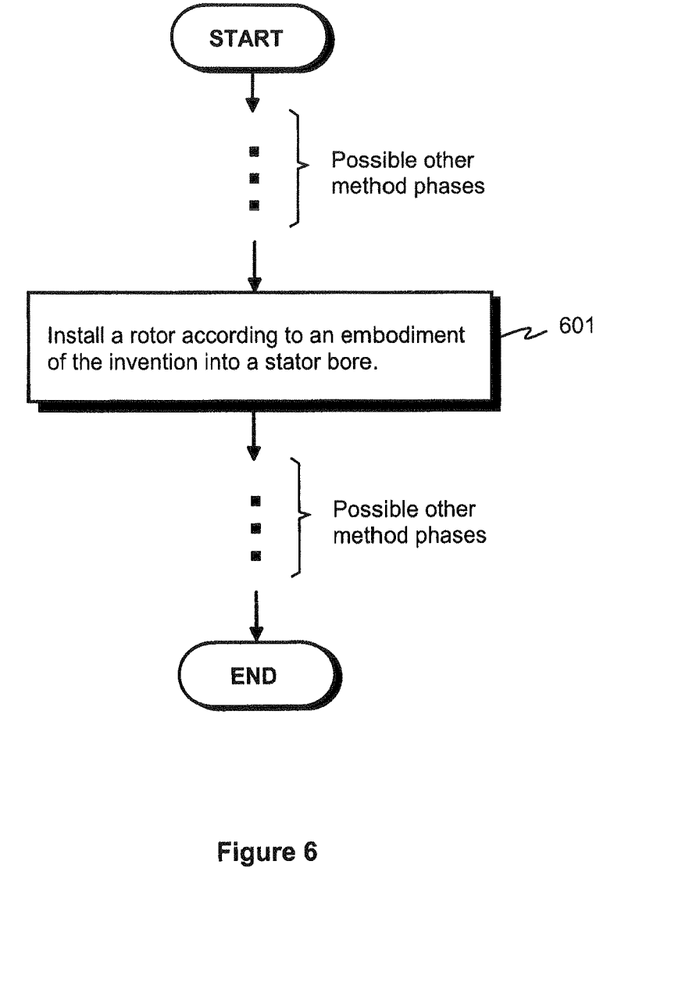
FIG. 6 is a flow chart of a method according to an embodiment of the invention for assembling a permanent magnet electrical machine.

FIG. 6 is a flow chart of a method according to an embodiment of the invention for assembling a permanent magnet electrical machine. The method comprises installing (phase 601) a rotor according to an embodiment of the invention into a stator bore of the permanent magnet electrical machine. The rotor comprises at least two permanent magnet modules according to an embodiment of the invention on a surface of a central part of the rotor and located successively in the tangential direction of the rotor. The permanent magnet modules can be, for example, according to what is described earlier in this document and with the aid of FIGS. 1a and 1b, or FIGS. 2a and 2b, or FIGS. 3a and 3b.

The specific examples provided in the description given above should not be construed as limiting. Therefore, the invention is not limited merely to the embodiments described above.

What is claimed is:

1. A permanent magnet module (101, 201, 301) for a rotor of a permanent magnet electrical machine, the permanent magnet module extending over at most 180 degrees in a tangential direction ($\phi$) of the rotor and comprising:
   a stack of ferromagnetic steel sheets (104, 204, 304) comprising at least one groove in a direction perpendicular to the ferromagnetic steel sheets,
   at least one permanent magnet (105, 205, 305a-305h) located in the at least one groove and arranged to produce magnetic flux that penetrates a surface (106, 206) of the stack of ferromagnetic steel sheets, the surface of the stack of ferromagnetic steel sheets having a shape suitable for forming a pre-determined magnetic flux density distribution into an air-gap of the permanent magnet electrical machine, and
   a supporting structure (114, 214, 215) arranged to mechanically support the stack of ferromagnetic steel sheets,
characterized in that the permanent magnet module further comprises at least one base-plate (102, 202, 302) made of solid ferromagnetic steel, each base-plate being located at an opening (116, 216, 316) of one of the at least one groove and constituting together with the at least one groove an aperture in which the at least one permanent magnet is located.

2. A permanent magnet module according to claim 1, wherein the permanent magnet module comprises at least one aperture (217, 317) arranged to allow flow of cooling fluid through the stack of ferromagnetic steel sheets.

3. A permanent magnet module according to claim 1, wherein the opening (216) of the groove is arranged to constitute a T-shaped groove and the base-plate (202) is arranged to constitute a T-shaped wedge for fastening the permanent magnet module to a central part (210) of the rotor.

4. A permanent magnet module according to claim 1, wherein the opening (316) of the groove is arranged to constitute a dovetail-shaped groove and the base-plate (302) is arranged to constitute a dovetail-shaped wedge for fastening the permanent magnet module to a central part of the rotor.

5. A permanent magnet module according to claim 1, wherein permanent magnet module is provided with a hermetic coating.

6. A permanent magnet module according to claim 5, wherein the hermetic coating is made of resin.

7. A permanent magnet module according to claim 1, wherein permanent magnet module comprises an end-plate (209, 213, 309, 313) at both ends of the stack of ferromagnetic steel sheets, the end-plates, the at least one base-plate, and the at least one groove forming at least one cavity for the at least one permanent magnet.

8. A permanent magnet module according to claim 7, wherein the end-plates are made of nonmagnetic material.

9. A permanent magnet module according to claim 1, wherein the permanent magnet module comprises a damper winding (218, 219, 220).

10. A permanent magnet module according to claim 1, wherein the permanent magnet comprises at least two pieces (305a, 305b) of permanent magnet material located successively in the tangential direction ($\phi$) of the rotor.

11. A permanent magnet module according to claim 1, wherein the permanent magnet comprises at least two pieces (305a, 305c) of permanent magnet material located successively in the direction perpendicular to the ferromagnetic steel sheets.

12. A rotor (429) of a permanent magnet electrical machine, the rotor comprising a central part (432) having a shaft (433), characterized in that the rotor comprises at least two permanent magnet modules (401, 401a, 401b, 401c) according to claim 1 on a surface of the central part and located successively in the tangential direction ($\phi$) of the rotor.

13. A permanent magnet electrical machine having a rotor (429) that comprises a central part (432) having a shaft (433), characterized in that the rotor comprises at least two permanent magnet modules (401, 401a, 401b, 401c) according to claim 1 on a surface of the central part and located successively in the tangential direction ($\phi$) of the rotor.

14. A method for assembling a rotor of a permanent magnet electrical machine, characterized in that the method comprises installing (501) a permanent magnet module according to claim 1 onto a surface of a central part of the rotor.

15. A method for assembling a permanent magnet electrical machine, the method comprising installing (601) a rotor into a stator bore of the permanent magnet electrical machine, characterized in that the rotor comprises at least two permanent magnet modules according to claim 1 on a surface of a central part of the rotor and located successively in the tangential direction of the rotor.

* * * * *